US010891024B2

(12) United States Patent
Nacu, Jr. et al.

(10) Patent No.: US 10,891,024 B2
(45) Date of Patent: Jan. 12, 2021

(54) HIERARCHICAL USER INTERFACE

(71) Applicant: NCR Corporation, Atlanta, GA (US)

(72) Inventors: Rodolfo Nacu, Jr., Cebu (PH); Mary Pauline Rodrigo Cabungcag, Dalaguete (PH); Chario Bardoquillo Maxilom, Ibabao Cordova (PH)

(73) Assignee: NCR Corporation, Atlanta, GA (US)

(*) Notice: Subject to any disclaimer, the term of this patent is extended or adjusted under 35 U.S.C. 154(b) by 60 days.

(21) Appl. No.: 16/261,795

(22) Filed: Jan. 30, 2019

(65) Prior Publication Data
US 2020/0241708 A1 Jul. 30, 2020

(51) Int. Cl.
*G06F 3/0482* (2013.01)
*G06F 9/54* (2006.01)
*G06F 3/0484* (2013.01)
*G06F 3/0481* (2013.01)
*G06F 9/451* (2018.01)

(52) U.S. Cl.
CPC .......... *G06F 3/0482* (2013.01); *G06F 3/0481* (2013.01); *G06F 3/04847* (2013.01); *G06F 9/452* (2018.02); *G06F 9/54* (2013.01)

(58) Field of Classification Search
CPC .. G06F 3/0482; G06F 3/0481; G06F 3/04847; G06F 9/452
See application file for complete search history.

(56) References Cited

U.S. PATENT DOCUMENTS

| 6,018,342 A * | 1/2000 | Bristor | G06F 16/353 |
| | | | 715/840 |
| 2007/0177179 A1* | 8/2007 | Takatsu | G06F 3/1204 |
| | | | 358/1.13 |
| 2009/0182605 A1* | 7/2009 | Lappas | G06Q 10/06 |
| | | | 705/34 |
| 2015/0149429 A1* | 5/2015 | Chilakamarri | G06F 16/9532 |
| | | | 707/706 |
| 2020/0082309 A1* | 3/2020 | Weeks | G06Q 10/063114 |

* cited by examiner

*Primary Examiner* — Sherrod L Keaton
(74) *Attorney, Agent, or Firm* — Schwegman, Lundberg & Woessner

(57) ABSTRACT

Operations to existing interfaces are mapped to categories. Options associated with each operation are mapped. A front-end hierarchical interface is generated from the mappings. An initial window is rendered for operation selection from the categories. A second window is generated based on user operation selection for user option selections. Once user option selections are made, and API is processed to cause an existing interface to generate a third window that places the user within the existing interface with a context/state defined by the user through the initial window and the second window with the operation and options selections.

4 Claims, 7 Drawing Sheets

HIERARCHICAL USER INTERFACE

BACKGROUND

Enterprises often have a variety of systems available for employees to perform daily tasks. Some tasks are more critical than other tasks, but generally all tasks can be completed through user interfaces directed to the systems.

The problem is that each system or each service of a particular system usually has its own separate interface, such that the employees have to master each separate interface and its idiosyncrasies. Many times an employee performing a given task for a first time is unable to navigate the menus of a given interface, as a result certain tasks are usually just assigned to the employee most adept at using the problem interface. If the knowledgeable employee is not at work or if the employee is too busy then tasks that are required of the employees may not be timely completed.

Enterprises also spend time and money in training their employees on the tasks and the various interfaces, which from an employee standpoint is wasted time since the interfaces are usually specific to the enterprise and knowledge of how to navigate such interfaces is not a skill that other potential employees would value.

Still further, the interfaces are often not stagnant, such that from time to time the enterprise introduces new versions of the interface. These updates or new releases result in a lot of consternation amongst the employees because controls are moved to different locations, which takes time to relearn where needed controls are located in the updated or new release of an interface.

SUMMARY

In various embodiments, methods and a system for a hierarchical user interface are presented.

According to an embodiment, a method for a hierarchical user interface is presented. Specifically, and in one embodiment, a first window of an interface is presented that maps operations from an existing interface to categories. A second window of the interface is rendered that maps options from the existing interface to the operations. Finally, the interface causes the existing interface to render a third window from within the existing interface after processing a selected operation with at least one selected option provided from a user interacting with the interface.

DETAILED DESCRIPTION

Figure 1A:
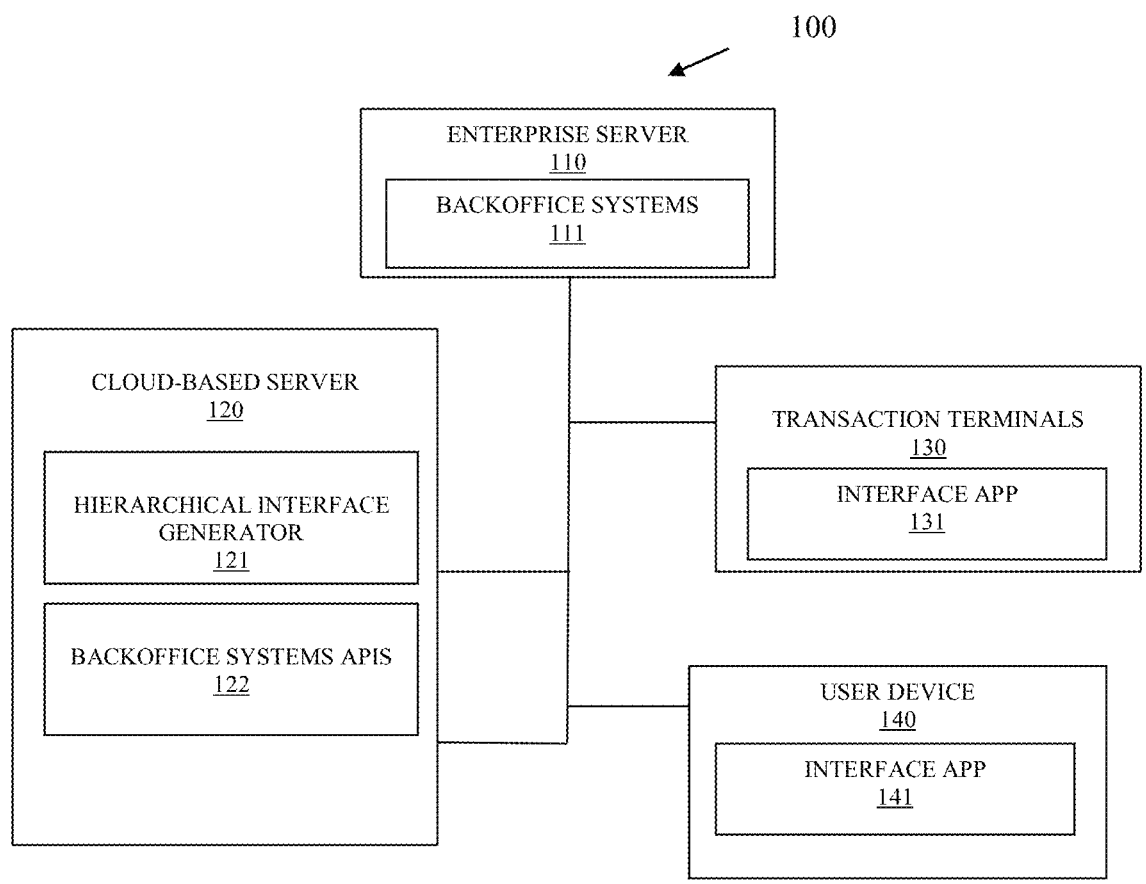
FIG. 1A is a diagram of a system for a hierarchical user interface, according to an example embodiment.

FIG. 1 is a diagram of a system 100 for a hierarchical user interface, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a hierarchical user interface presented herein and below.

The system 100 includes an enterprise server 110 having a back office systems 111; a cloud-based server 120 having a hierarchical interface generator 121 and back office systems Applicant Programming Interfaces (APIs); transaction terminals 130 having interface applications (apps) 131, and user devices 140 having interface apps 141.

The components 111, 121, 122, 131, and 141 are provided as executable instructions that reside in non-transitory computer-readable storage mediums and are executed from those mediums by hardware processors on their respective devices 110, 120, 130, and 140.

As discussed above, access to existing interfaces of back office systems is a cumbersome task that can require many different interfaces and many different interface screens be accessed by the user. The teaching presented herein describe a module hierarchical interface that permits a user to access any back office operation through a minimal number of interface screens.

As used herein, an "interface screen" is text, video, images, graphics, and/or audio information that is arranged to fit on a display of a device as rendered visual information within a window. The interface screens may be interactive and include selectable fields, menus, and/or input fields that can be selected or can have data inputted by the user. Selection of a selectable field may result in rendering new interface screen. The phrase "interface screen" may be used synonymously and interchangeably with the term "window."

As used herein, the term "user" and "operator" may be used synonymously and interchangeably with one another.

Operations performed by the users through the back office systems 111 are categorized into three categories: updating, configuring, and extracting. All existing interfaces associated with operations where data can be updated are identified as is all operations associated with configuring resources and extracting data from enterprise data stores. These operations are mapped to their respective interfaces and the back office APIs 122 provide the commands to directly initiate the operations.

It is to be noted that operations that are performed by the back office system interfaces can be categorized and mapped into more than just the above-mentioned three of updating, configuring, and extracting. For example, a fourth category may include resource scheduling and/or ordering (although this may also be subsumed within configuring).

However, it is observed that as the number of categories increase, the level of complexity associated with user interaction with the interfaces increase. Thus, having three categories is believed to be an optimal number that is easy to understand and operate by the user.

Each operation available from the existing interface is categorized into one of the three categories. Next, the options associated processing the operations are mapped to the categories and are directly accessible via the APIs 122.

The hierarchical interface generator 121 provides an alternative and front end interface to the existing interfaces of the back office systems 111 based on the category mappings, the options, and the APIs 122. The APIs 122 provide an automated mechanism for the hierarchical interface generator 121 to directly access the existing interfaces or services associated with those existing interfaces and process an operation from newly rendered windows provided by a generated hierarchical interface.

Each of the three categories are presented in an initial splash window rendered by the hierarchical interface generator 121. The three categories are identified by selection within the splash window. Once a selection from one of the three are made, a selectable menus is presented to identify one of the mapped operations associated with that category. When a selection of a mapped operation is made, hierarchical interface generator 121 renders a second window specific to the selected operation that identifies all the mapped options associated with the selected operation. Within the second rendered window, when the user selects an option (any available sup-options associated with that option are presented for user entry and/or selection. When the user has selected the option and any sub-options (can be inputted through the second rendered window as well), the operation with all the options is processed by the APIs through the mappings with the existing back office system interfaces/services and a final rendered window is presented showing the user the results.

Rather than a user having to learn all the back office system interfaces, the user can perform any hardware and software resource operation through three easy to understand windows generated by the hierarchical interface generator 121 as three-level hierarchical interface. The complexity and particulars of each of the existing enterprise interfaces are completely hidden from the user.

Figure 1B:
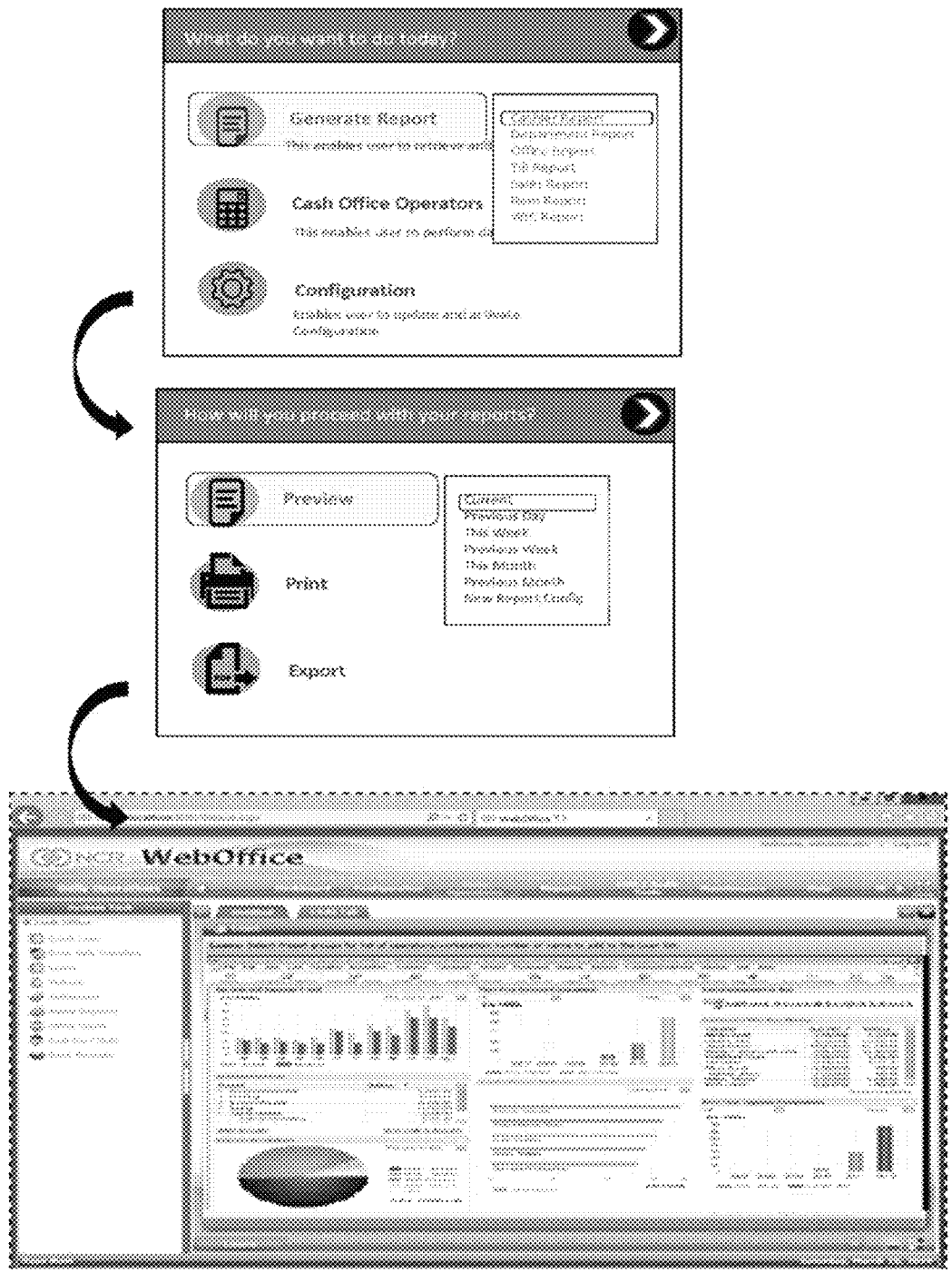
FIG. 1B is an example set of windows generated by a hierarchical user interface, according to an example embodiment.
Figure 1C:
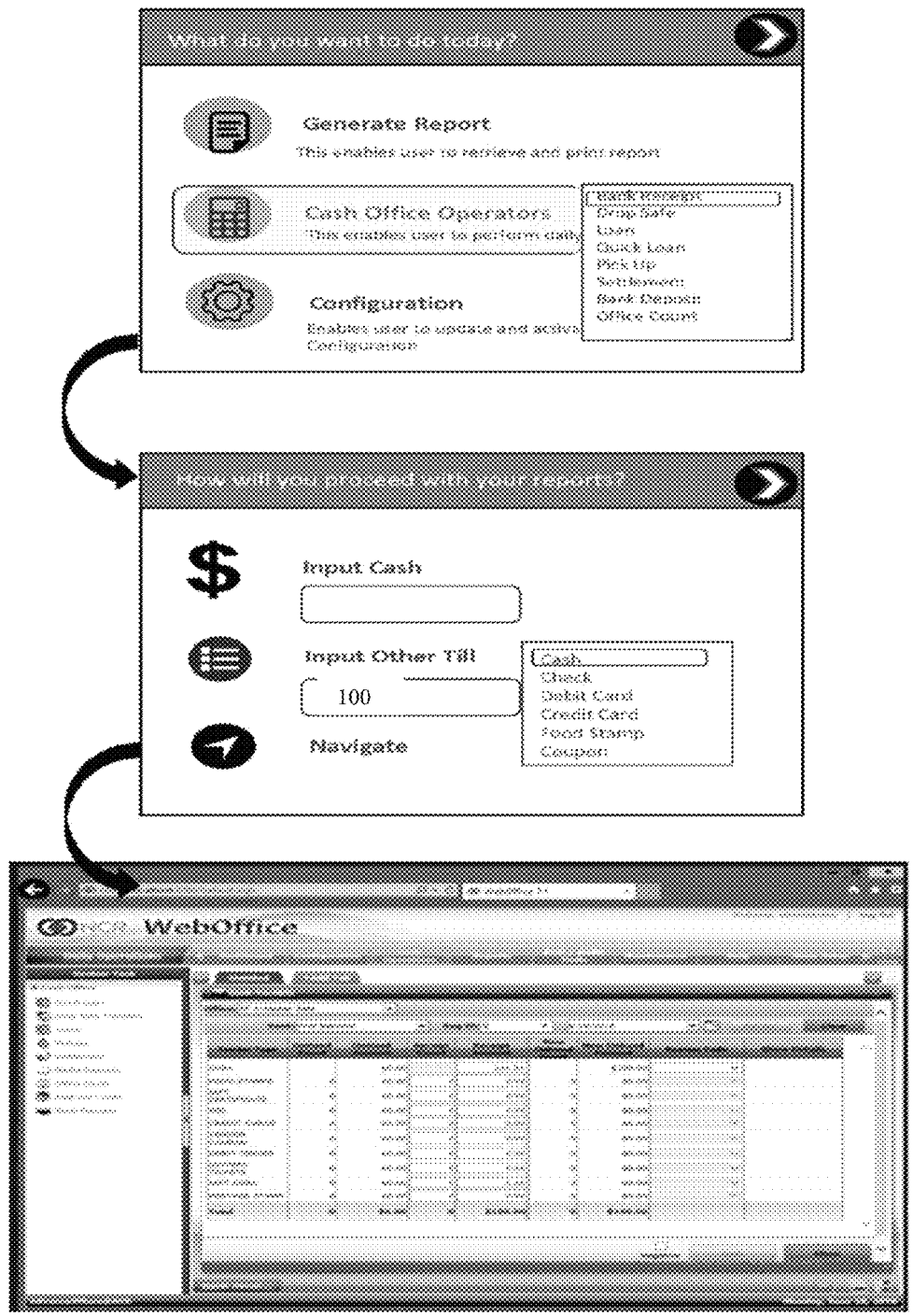
FIG. 1C is another example set of windows generated by the hierarchical user interface, according to an example embodiment.
Figure 1D:
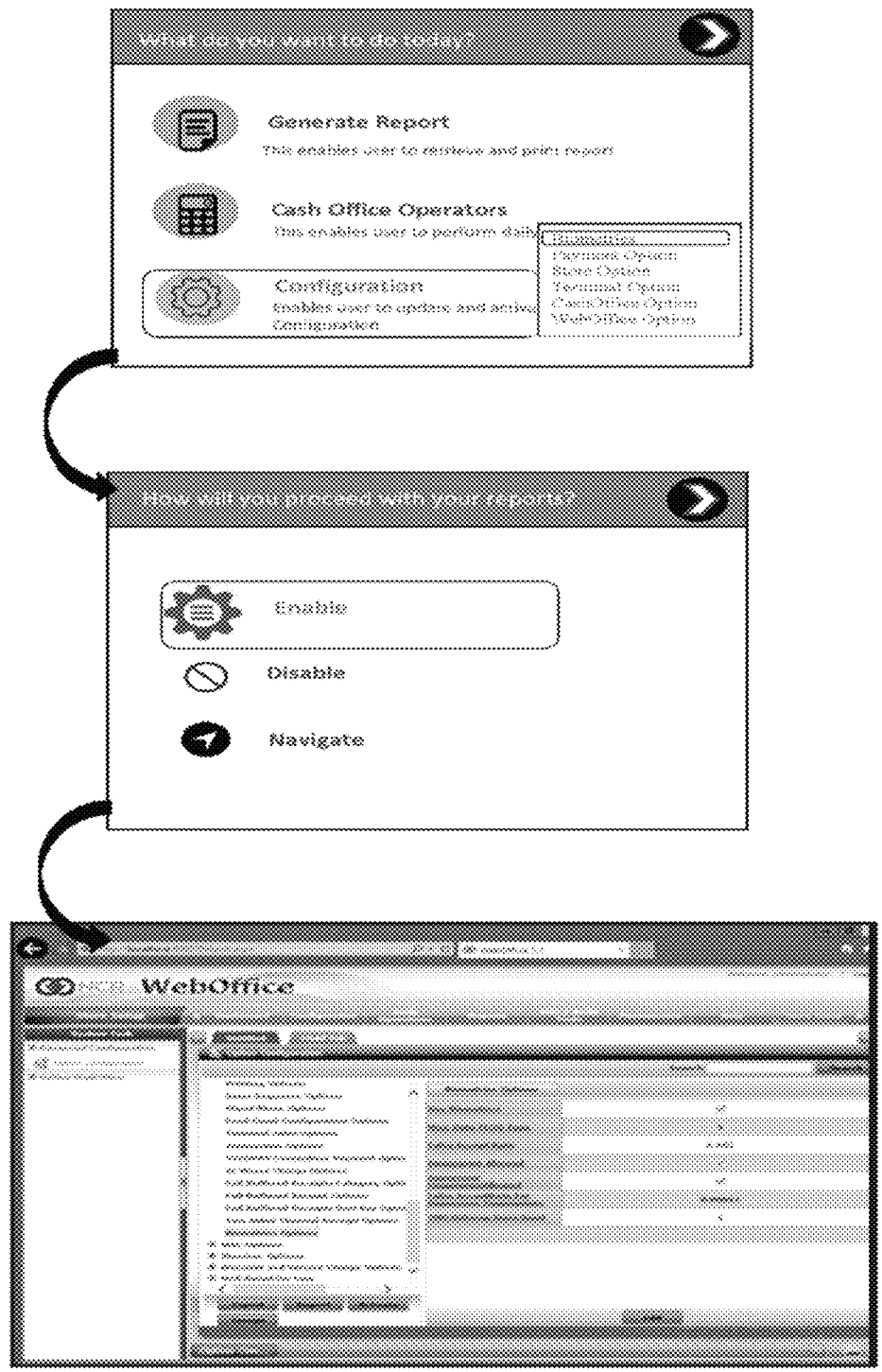
FIG. 1D is still another example set of windows generated by the hierarchical user interface, according to an example embodiment.

The windows generated in an example 3-level hierarchical interface by the hierarchical interface generator 121 are illustrated in the FIGS. 1B-1D.

The FIG. 1B is an example set of windows generated by a hierarchical user interface when the user selects a data extraction category operation. The initial splash window identifies the three categories in a manner that is intuitive to the user. For example, data extraction category is identified as "Generate Report," update category is identified as "Cash Office Operations," and resource configuration is identified as "Configuration." The FIG. 1B illustrates that in the initial splash window the user selected "Generate Report" (data extraction), the available operations mapped to the data extraction is provided for selection within the splash window. In the example of the FIG. 1B, the user selected an "Office Report" operation. Once this selection is made, the hierarchical interface generator 121 generates a second window (shown under the splash window). Here, the options are presented as preview, print, and export and the sub options associated with a time range or context of the report is shown to the right where the user has selected "current" for current day. Once this is selected, the hierarchical interface generator 121 performs the operation with the options (including sub options) using the APIs 122 by contacting the back office reporting service or accessing the back office existing reporting interface. This results in a third window, which may be the actual window generated by an existing interface of the back office systems 111 and which was generated based on the APIs 122 instructing the report be provided. It is to be noted that the details shown in the report are irrelevant and are not necessary for an understanding of the teachings provided herein. As this can be any generated report for any desired subject matter offered by an existing back office interface.

The FIG. 1C is an example set of windows generated by a hierarchical user interface when the user selects a data/resource update category operation. Again, initial splash window identifies the three categories in a manner that is intuitive to the user. The data/resource update category is identified by the "Cash Office Operations" selectable item in the splash screen which was selected by a user from the hierarchical user interface in this example. Again, the available operations associated with the update categories as shown as a menu of selectable items to the user within the splash window. In the example, the user selects "Bank Receipt" operation. Once this operation is selected from the category, the hierarchical interface generator 121 generates a second window associated with the options for that operation. Here, the options require input by the user through input fields identified as "Cash" and "Input Other Till," sub options include a selection of cash made by the user. Once the user inputs the cash. In the example, the user inputs 100 into the Input Other Till field as cash selected. This causes the hierarchical interface generator 121 to uses the APIs to the mapped operations, options, and sub-options to call the existing back office interface/service and process the user-selected operation with the options (including the user provided sub-option value of 100). The existing interface then generates the third window and the user is placed within the existing interface at the exact location desired by the user and the entry made by the user is displayed as having been updated.

FIG. 1D is still another example set of windows generated by the hierarchical user interface when the user selects a resource/date configuration operation (identified as "Configuration" within the initial splash screen produced by the hierarchical interface generator 121 for the hierarchical interface. The operations associated with configuration are presented as selectable menu items on the right. Here the user selected Biometrics configuration operation. The hierarchical interface generator 121 then generates available options in a second window within the hierarchical interface, these options include enable and disable. The user selects Enable option. This causes the hierarchical interface generator 121 to use the APIs to call the appropriate existing back office interface to perform biometric enabling. The appropriate interface screen of the existing interface is then produced and the user is located in the correct location of the interface associated with biometric enablement.

The hierarchical interface generator 121 combined with the APIs 122 permit uses to bypass existing legacy interfaces to perform operations within 3 windows, only two of which are provided by the hierarchical interface the $3^{rd}$ window generated by the existing legacy interface. The hierarchical interface generator 121 provides a front-end interface to existing back office system interfaces and allows a user to be placed in a user-desired context (state) within a proper existing interface by selections made with the hierarchical interface.

In an embodiment, the hierarchical interface includes a 2 level hierarchy identified by the splash window and the options window. The $3^{rd}$ level is the actual existing interface screen of the existing interface.

In an embodiment, the hierarchical interface generator 121 acts as a front-end to a plurality of back office system existing interfaces.

In an embodiment, the existing interfaces are not changed or modified by the hierarchical interface generator 121; rather, APIs 122 to existing functionality of the existing and legacy interfaces are processed by the hierarchical interface generator 121 to place a user in an exact context of those existing and legacy interfaces through just two windows of the hierarchical interface.

In an embodiment, the hierarchical interface generator 121 can be reached through any existing device that has access to the back office systems 111. For example, user operated devices 140 through a mobile-based interface app 141; through an interface app 131 of the transaction terminals 131, through a web-based browser interface from a browser of the user device 140 or the transaction terminals.

In an embodiment, the user is redirected to the hierarchical interface generator 121 when attempting to access any of the back office systems 111; this can be done by a proxy or by changing a link from the back office systems 111 to a be a link that access the hierarchical interface generator 121. Any proxy arrangement can be called from as a forward proxy to the transaction terminals 130 and user devices 140, such that when the link associated with a back office system 111 is accessed, the proxy intercepts and forwards to the hierarchical interface generator 121. Alternatively, a proxy arrangement can be a reverse proxy to the enterprise server 110, such that when network requests are received at the enterprise sever 110 for the back office systems 111, the requests are redirected to the hierarchical interface generator 121.

In an embodiment, the hierarchical interface generator 121 and the APIs 122 reside on the enterprise server 110 and are not provided as a separate cloud-based server.

In an embodiment, the transaction terminals include: Self-Service Terminals (SSTs), Point-Of-Sale (POS) terminals, Automated Teller Machines (ATMs), and kiosks.

In an embodiment, the user devices 140 include: phones, tablets, wearable processing devices, desktop computers, and Internet-of-Things (IoT) devices.

These and other embodiments are now discussed with reference to the FIGS. 2-4.

Figure 2:
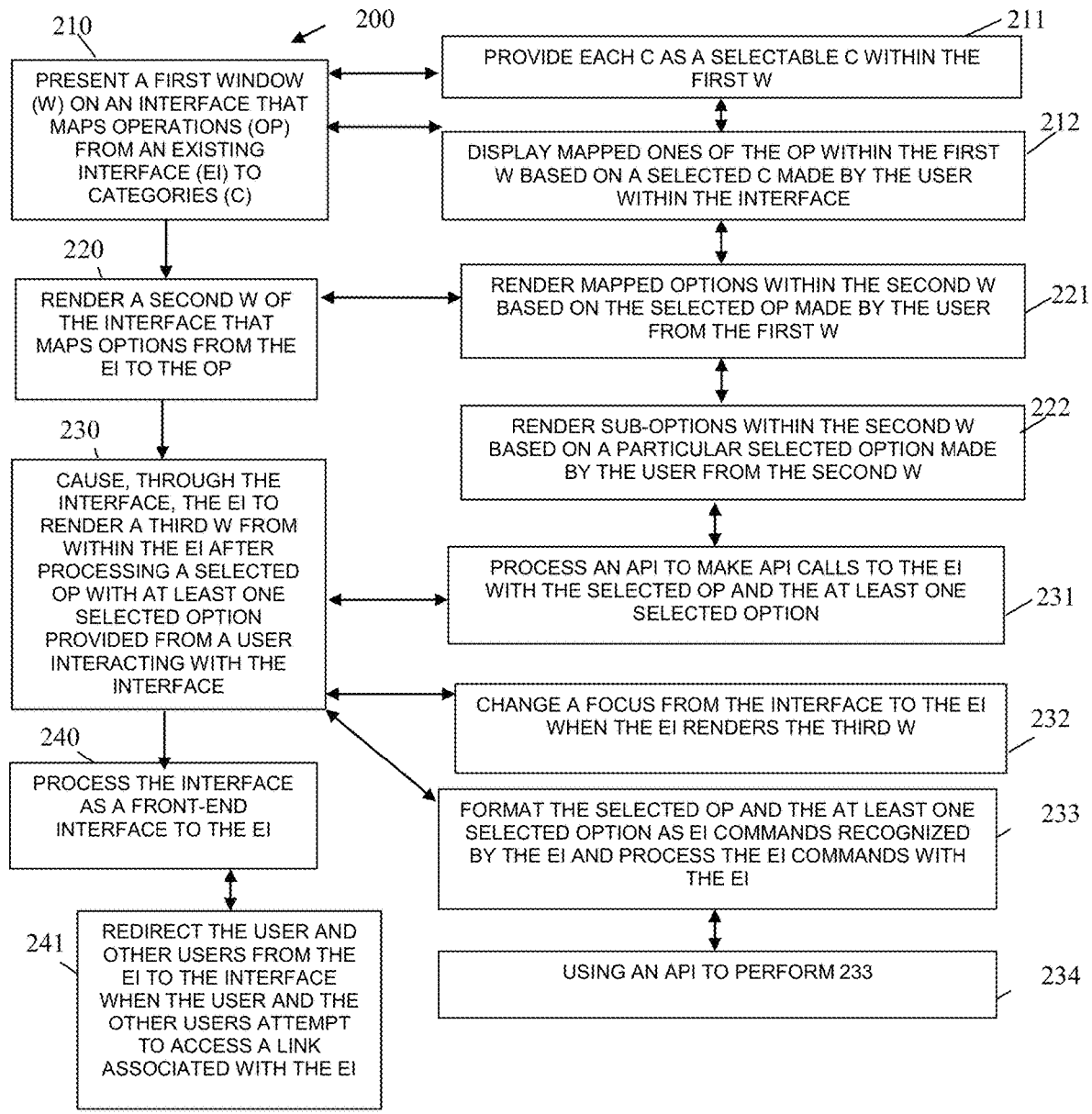
FIG. 2 is a diagram of a method for a hierarchical user interface, according to an example embodiment.

FIG. 2 is a diagram of a method 200 for a hierarchical user interface, according to an example embodiment. The software module(s) that implements the method 200 is referred to as a "front-end interface manager." The front-end interface manager is implemented as executable instructions programmed and residing within memory and/or a non-transitory computer-readable (processor-readable) storage medium and executed by one or more processors of a device. The processor(s) of the device that executes the front-end interface manager are specifically configured and programmed to process the front-end interface manager. The front-end interface manager has access to one or more network connections during its processing. The network connections can be wired, wireless, or a combination of wired and wireless.

In an embodiment, the device that executes the front-end interface manager is the cloud-based server 120.

In an embodiment, the device that executes the front-end interface manager is the enterprise server 110.

In an embodiment, the front-end interface manager is all or some combination of the hierarchical interface generator 121 and the back office systems APIs 122.

At 210, the front-end interface manager present a first window on an interface that maps operation from an existing interface to categories.

In an embodiment, at 211, the front-end interface manager provides each category as a selectable category within the first window.

In an embodiment of 211 and at 212, the front-end interface manager displays mapped ones of the operations within the first window based on a selected category made by the user within the interface from the first window. Examples of such selections and some sample categories were described above with the FIGS. 1B-1D.

At 220, the front-end interface manager renders a second window of the interface that maps options from the existing interface to the operations that are mapped to the categories.

In an embodiment of 212 and 220, at 221, the front-end interface manager renders mapped options within the second window based on the selected operation made by the user from the first window. That is, the second window is dynamically rendered and determined based on selections made in the first window.

In an embodiment of 221 and at 222, the front-end interface manager renders sub-options within the second window based on a particular selected option made by the user within the second window. Again, the available sub options available for input by the user or selection by the user are determined dynamically based on the particular selected option.

At 230, the front-end interface manager causes through the interface, the existing interface to render a third window from within the processing context of the existing interface after the front-end interface manager processes a selected operation with at least one selected option provided from the user through interaction with the interface within the first window and the second window.

In an embodiment of 222 and 230, at 231, the front-end interface manager processes an API (such as API 122) to make API calls to the existing interface with the selected operation and the at least one selected option.

In an embodiment, at 232, the front-end interface manager changes a focus from the interface to the existing interface when the existing interface renders the third window.

In an embodiment, at 233, the front-end interface manager formats the selected operation and the at least one selected option as existing interface commands that are recognized by the existing interface. The front-end interface manager then processes the existing interface commands with the existing interface to cause the existing interface to produce the third window.

In an embodiment of 233 and at 234, the front-end interface manager uses an API to perform 233, such as API 122.

In an embodiment, at 240, the front-end interface manager is processed as a front-end interface to the existing interface.

In an embodiment, the front-end interface manager provides a single front-end interface to a plurality of additional existing interfaces associated with back office systems 111.

In an embodiment of 240 and at 241, the front-end interface manager redirects the user and other users from the existing interface to the interface when the user and the other users attempt to access a link or a network address associated with the existing interface.

Figure 3:
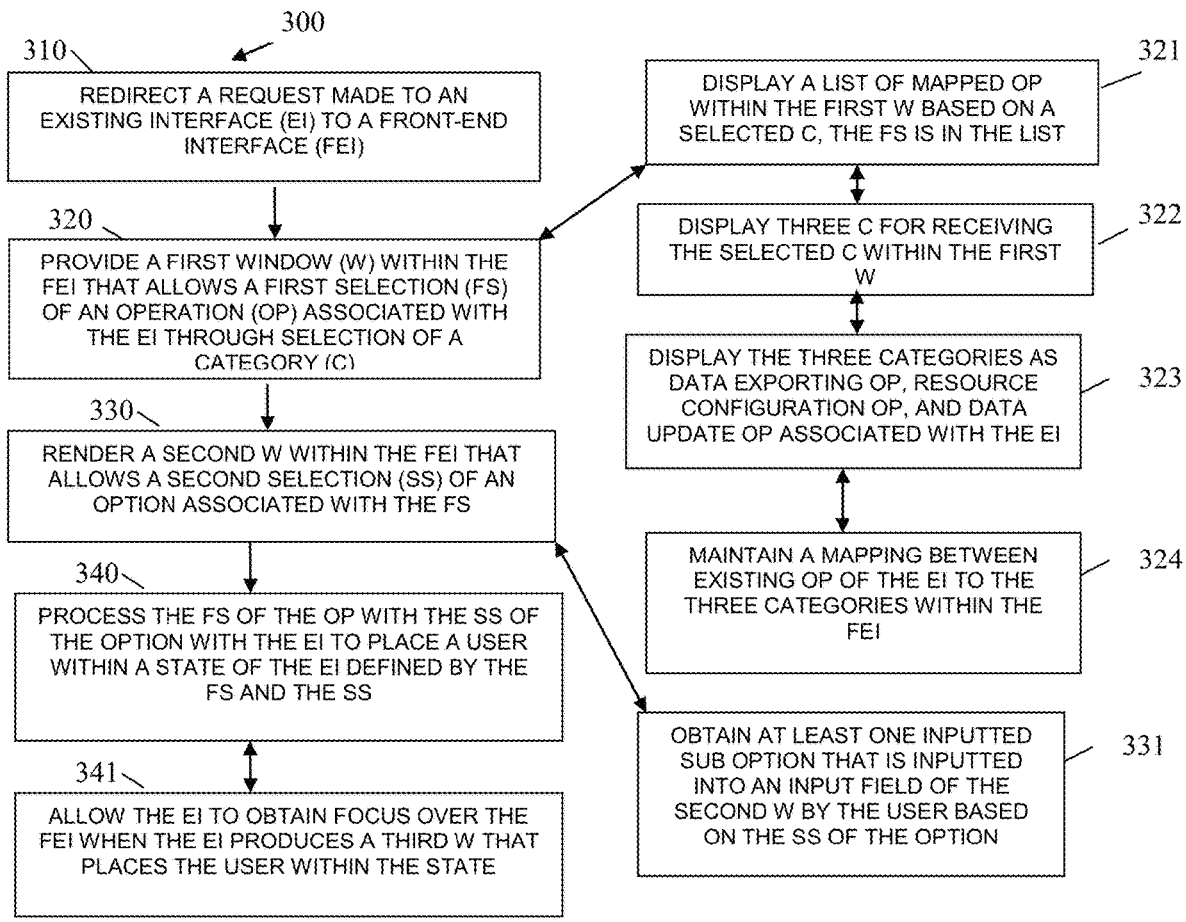
FIG. 3 is a diagram of another method for a hierarchical user interface, according to an example embodiment.

FIG. 3 is a diagram of another method 300 for a hierarchical user interface, according to an example embodiment. The software module(s) that implements the method 300 is referred to as an "interface context manager." The interface context manager is implemented as executable instructions programmed and residing within memory and/or a non-transitory computer-readable (processor-readable) storage medium and executed by one or more processors of a device. The processors that execute the interface context manager are specifically configured and programmed to process the interface context manager. The interface context manager has access to one or more network connections during its processing. The network connections can be wired, wireless, or a combination of wired and wireless.

In an embodiment, the device that executes the interface context manager is the cloud-based server 120.

In an embodiment, the device that executes the interface context manager is the enterprise server 110.

In an embodiment, the interface context manager is all of some combination of: the hierarchical interface generator 121, the back office systems APIs 122, and/or the method 200.

In an embodiment, the interface context manager presents another and in some ways enhanced processing perspective from that which was shown in the method 200 of the FIG. 2.

At 310, the interface context manager redirects a request made from a user to an existing interface to a front-end interface.

At 320, the interface context manager provides a first window within the front-end interface that allows a first selection of an operation associated with the existing interface through selection of a category.

In an embodiment, at 321, the interface context manager displays a list of mapped operations within the first window based on a selected category, wherein the first selection is made from the list and the list is dynamically generated based on the selected category made by the user within the first window of the front-end interface.

In an embodiment of 321 and at 322, the interface context manager displays three categories for receiving the selected category within the first window.

In an embodiment of 322 and at 323, the interface context manager displays the three categories as: data exporting operations, resource configuration operations, and data update operations associated with the existing interface.

In an embodiment of 323 and at 324, the interface context manager maintains mappings between existing operations of the existing interface to the three categories within the front-end interface.

At 330, the interface context manager renders a second window within the front-end interface that allows a second selection of an option associated with the first selected operation (selected from the first window).

In an embodiment, at 331, the interface context manager obtains at least one inputted sub option that is inputted into an input field of the second window by the user based on the second selected option.

At 340, the interface context manager processes the first selected operation with the second selected option(s) with the existing interface to place a user within a state of the existing interface defined by the first selected operation and the second selected option(s).

In an embodiment, at 341, the interface context manager allows the existing interface to obtain or gain focus or control over the front-end interface when the existing interface produces a third window that places the user within the state.

Figure 4:
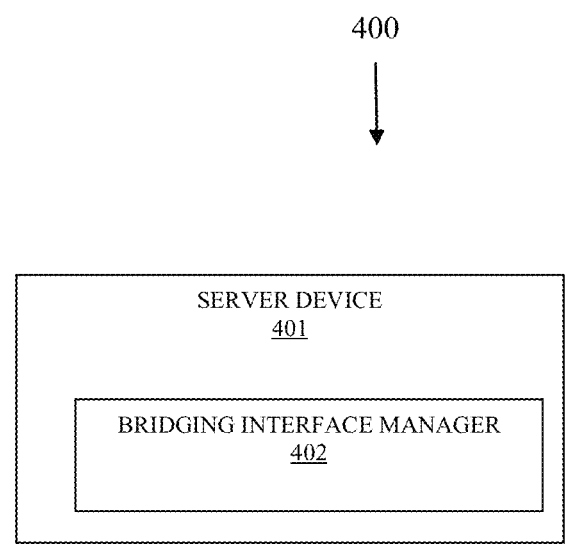
FIG. 4 is a diagram of a system for a hierarchical user interface, according to an example embodiment.

FIG. 4 is a diagram of a system 400 for a hierarchical user interface, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1A-1D and 2-3.

The system 400 is the system 100.

The system 400 includes a server device 401 and a bridging interface manager 402. The server device 401 includes executable instructions residing in a non-transitory computer-readable storage medium of the server device 401 representing the bridging interface manager 402, which is executed by a hardware processor of the server device 401.

In an embodiment, the bridging interface manager 402 is all or some combination of the hierarchical interface generator 121, the back office systems APIs, the method 200, and/or the method 300.

In an embodiment, the server device 401 is the cloud-based server 120.

In an embodiment, the server device 401 is the enterprise server 110.

The bridging interface manager 402, when executed by the hardware processor of the server device 401 from the non-transitory computer-readable storage medium, is configured to perform processing to: map existing operations for an existing interface to categories; map existing options for the existing operations to mapped operations of the categories; provide a front-end interface to a user that allows a user to define an existing operation and corresponding existing options within the front-end interface through user selection of a particular category, a particular operation for that particular category, and particular options for that particular operation; process the particular operation with the particular options within the existing interface through Application Programming Interface (API) calls that utilize the existing operations and the existing options; and relinquish control of the front-end interface to an interface window generated by the existing interface for the user to continue interaction with the existing interface.

In an embodiment, the bridging interface manager 402 is further configured to perform processing to: provide the front-end interface as two dynamically generated hierarchical windows.

The bridging interface manager 402 bridges between an existing interface and provides a front-end interface to an existing interface and its existing services available through existing operations. Once a user defines an operation for a service associated with the existing interface through the two front-end interface windows, the operation is processed with the service and the user is placed within a state or context of the window generated by the existing interface.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

redirecting a request made to an existing interface to a front-end interface;

providing a first window within the front-end interface that allows a first selection of an operation associated with the existing interface through selection of a category, wherein providing further includes displaying a list of mapped operations within the first window based on a selected category made within the first window, where the user makes the first selection from the list, wherein displaying further includes displaying three categories for receiving the selected category within the first window, and wherein displaying further includes displaying the three categories as data exporting operations associated with the existing interface, resource configuration operations associated with the existing interface, and data update operations associated with the existing interface;

rendering a second window within the front-end interface that allows a second selection of an option associated with the first selection; and processing the first selection of the operation with the second selection of the option with the existing interface to place a user associated with the request within a state of the existing interface defined by the first selection and the second selection.

2. The method of claim 1, wherein displaying further includes maintaining a mapping between existing operations of the existing interface to the three categories within the front-end interface.

3. The method of claim 1, wherein rendering further includes obtaining at least one inputted sub option that is inputted into an input field of the second window by the user based on the second selection of the option.

4. The method of claim 3, wherein processing further includes allowing the existing interface to obtain focus over the front-end interface when the existing interface produces a third window that places the user within the state.

* * * * *